Patented May 9, 1950

2,506,793

UNITED STATES PATENT OFFICE 2,506,793

METHOD OF PRODUCING FRESH WHOLE PEELED POTATO PRODUCTS

Arthur F. Kalmar, Riverside, and Robert W. Kilburn and Harry M. Pancoast, Jr., San Jose, Calif., assignors to Food Machinery and Chemical Corporation, San Jose, Calif., a corporation of Delaware No Drawing. Application January 13, 1947, Serial No. 721,882

3 Claims. (Cl. 99—154)

This invention relates to the marketing of fresh, whole, peeled potatoes and it is a principal object of this invention to provide a process of treating peeled potatoes so as to cause the resulting product to remain in a fresh, marketable condition through relatively long periods of storage.

It is another object of the invention to provide a food product comprising fresh, whole, peeled potatoes which have been so treated that a portion of the surface thereof constitutes an envelop for the interior of the potato so that the entire potato is resistant for relatively long periods to deterioration by enzymatic oxidation.

It is another object of this invention to provide a method of preparing fresh, whole, peeled potatoes for the retail market in which each potato is provided with a relatively thin cooked layer entirely encasing the potato and this layer employed as a reactive storage zone for retaining the preservative chemical which thus, likewise, completely envelops the fresh interior portion of the potato and effectively preserves this for a relatively long period against contamination by the atmosphere and particularly from darkening due to oxidation.

Previous methods devised for preserving fresh, whole, peeled potatoes against darkening have been made use of compounds containing $SO_2$ as enzymatic inhibitors. These processes either resulted in the application to the potato of such a large amount of the inhibitor in order to prevent darkening for the desired length of time that the potato would taste of the $SO_2$ when cooked and served, or else, to avoid this difficulty, the potatoes were allowed to absorb such a small amount of the inhibitor that they could not be depended upon to resist darkening throughout the minimum period that this was necessary.

It is yet another object of this invention to provide a fresh, whole, peeled potato product and a method of producing the same in which the desired preservation of the peeled product is obtained without requiring it to absorb amounts of preservative which produce objectionable taste or odor.

A still further object of the invention is to provide a fresh, whole, peeled potato product and a method of producing the same in which the preservative agent absorbed by the potato is activated to render this much more effective in its preservative action than would be normally obtained by the same amount of preservative agent, and at the same time produce a bleaching effect.

In a raw peeled potato or a raw trimmed surface area of a potato, surface cells having an active oxidative enzyme system are in direct contact with atmospheric oxygen. Sulfur dioxide applied to this surface in present preservative methods prevents darkening by inactivation of the enzymes by reacting with atmospheric oxygen contacting this surface thus using up the oxygen before it can react with the cell constituents to form dark colors. However, sulfur dioxide in such raw surface cells rapidly diffuses into the atmosphere and is soon so reduced in concentration in these cells that darkening will occur. Sulfur dioxide lost in this manner can only be replaced by outward diffusion from inner portions of the potato. Thus, to make available a sufficient quantity of $SO_2$ to replace the surface losses, the concentration of $SO_2$ in the potato must be maintained above a level readily recognized by taste.

Cooking a potato inactivates the enzymes which would otherwise cause rapid enzymatic browning; although, such cooked potatoes may still undergo slow non-enzymatic oxydative discoloration. We have discovered that a relatively thin cooked layer of uniform depth over the entire surface which layer is impregnated with sulfur dioxide, provides a protective envelope completely surrounding the raw enzyme containing inner portions of the potato. This layer constitutes a reservoir of sulfur dioxide which inactivates the enzymes at the interface by reacting with atmospheric oxygen in the cooked envelope. In order to reach the enzymatic area at the interface, atmospheric oxygen must travel through the cooked layer by the relatively slow process of diffusion giving the sulfite reducing agent ample time to react chemically with the oxygen and thus prevent the latter from coming into contact with the enzymes. The amount of $SO_2$ present is also sufficient to prevent the non-enzymatic darkening of the cooked portion of the potato. This dual defense mechanism makes it possible to protect potatoes enclosed in a thin cooked layer of uniform depth with a fraction of that sulfite concentration needed to prevent discoloration of a potato the surface of which is raw.

To prepare potatoes for treatment by our process they are washed, and then peeled by any of the commercial methods provided for this purpose. These include peeling by abrasion, peeling in batches under steam pressure, peeling continuously under steam pressure, peeling by flame, and peeling with a hot lye solution. Following this treatment, the potatoes are washed with a rubbing action to remove the loose skins.

After this, the potatoes are hand-trimmed to remove portions of the skin still adhering thereto in certain of the eyes and surface cavities, and to cut out any spoiled portions.

Peeling by some methods employing heat, such as the use of lye baths or steam under pressure, results in cooking the starchy cells on the surface of the potato just beneath the skin. The vigorous washing and mechanical abrasion step which follows the peeling treatment removes not only the skin but also portions of the cooked starchy cells from the surface of the potato. Furthermore, the trimming step necessarily extends through the layer of cooked cells to expose raw surfaces of uncooked starchy cells in those areas where trimming was necessary. No matter how the potatoes were peeled, therefore, they come out of the trimming step of this process with uncooked starchy cells of the potato exposed to the atmosphere over considerable areas, and, where heat was used in the peeling operation, the outer surface of the balance of the potato is provided with a layer of cooked cells fluctuating considerably in thickness.

Following the trimming step of the present invention, and with the potatoes in the condition noted, they are subjected to heat as by dipping them in boiling water or passing them through a steam bath for a sufficient period of time to cook a layer of the outer starchy cells of the potato to a uniform depth of between $\frac{1}{16}$ and $\frac{1}{8}$ of an inch. Such a layer of cooked cells may be produced by dipping the potatoes in boiling water for 90 seconds.

The application of heat to the potato in this step also performs the important function of killing the decay producing organisms with which the potatoes were infected during the peeling, washing and trimming steps.

Immediately following this heat treating step, the potatoes are removed from the hot water or steam and cooled. It has been found that a cooked surface of uniform thickness completely enveloping the potato is thus produced, regardless of whether or not cooked cells remained on certain areas of the potato surface, which were produced by the use of heat in the peeling process. This layer performs an important function in relation to the step which follows.

In this step the potatoes are contacted with an aqueous solution of an enzymatic oxidation inhibitor which is preferably sulfurous acid, or a salt of sulfurous acid, as by dipping, flooding or spraying. The typical action of such inhibitors results from the fact that they are chemical reducing agents which act to absorb oxygen, thereby denying this to the enzymatic system of the potatoes. The salts of sulfurous acid useful in this method include sulfites, bisulfites, and metabisulfites, such as those of sodium or potassium.

While not essential to realizing certain of the objects of the invention, the latter embraces a further step for the purpose of activating the preservative agent. This is accomplished by treating the sulfited potatoes with a fine mist of a dilute aqueous solution of an edible acid which activates the preservative agent by lowering the pH and increasing the dissocation of the agent, with the release of $SO_2$, thereby making it highly effective during the normal period of storage through which it is desired to preserve the potatoes against discoloration. Suitable acids for this step include the following: citric, tartaric, acetic, phosphoric, and hydrochloric, and a one molal strength is satisfactory.

The solutions of preservative agent and edible acid applied in the previous two steps of the invention are allowed to remain on the potatoes and the latter are bagged and placed under refrigeration at a temperature preferably between 38° F. and 42° F. The bags used for this purpose are such as will keep the potatoes from drying out but will not develop excessive humidity therein under refrigeration. Bags formed of parchment or cellulose acetate have been found satisfactory.

The product of our invention, when bagged and refrigerated as indicated, will keep over three weeks without showing any signs of discoloration and at the end of this period the potatoes are practically in as fresh a condition as when they were first peeled.

The resistance of the product of this invention to decay is likewise notably superior to similar products prepared by competing processes. This is attributed in considerable measure to the heat treatment which follows the washing and trimming operations. In fact, no opportunity is presented, between the heat treating step of the invention and the placing of the product in bags, for inoculation of the product with decay causing organisms. The fact that the product is drenched with a preservative agent during this period, which also acts as a growth retardant for such organisms, enhances the effectiveness of the heat treating step in preventing mold or decay of the product during storage.

The preservative agent employed is preferably sodium metabisulfite. Best results have been with a solution of this containing 1% $SO_2$ and buffered to a pH of 2, although under some conditions a solution containing 2% $SO_2$ may be employed without the product having a sulfurous taste when cooked.

For best results with this invention, the uniform cooked layer provided on the potato should be not less than $\frac{1}{16}$ inch thick, as experience has shown that potatoes with a cooked layer only $1/32$ of an inch in thickness tend to turn gray in color after 8 days of refrigerated storage.

The period which the potatoes may be allowed to remain in the preservative solution in the step of applying the latter may vary from a few seconds up to two minutes. The stronger the solution, the shorter the dipping period may be, optimum results having been attained with a solution containing 1.6% sodium metabisulfite and applying this to the potatoes for 50 seconds.

While it is possible to unite the step of applying the sulfurous preservative agent to the potatoes with the step of applying an edible acid to activate this agent, by mixing the two together and applying the mixture to the potato as by dipping, flooding or spraying, it has been found that the preservative agent thus activated is rapidly lost by volatilization and creates a disagreeable and noxious atmosphere in the vicinity of the treating apparatus, rendering it preferable to apply the edible acid as a separate step following the application of the preservative agent.

Careful studies have shown that the concentration of active agent, expressed as $SO_2$, at the interface between the cooked layer and the raw starchy interior of the potato increases for 24 hours following the processing of the product. For instance, dipping for 2 minutes in a solution containing 1% of active agent expressed as $SO_2$ of pH 2.5 made with one molal citric acid and sodium metabisulfite and with the potatoes standing thereafter in air at room temperature, the concentration of $SO_2$ at the interface after two hours was 63 P. P. M.; at four hours it was 71 P. P. M.; and at 24 hours, 75.4 P. P. M.

Studies also show that following the preservative applying step of this invention, in which a solution containing 1% of active agent $SO_2$ with pH 2 is applied for 30 seconds to the peeled potatoes, the preservative solution uniformly penetrates the potato so that, 48 hours after the treatment, this agent has reached a depth of $\frac{1}{8}$ of an inch. In other words, the preservative agent has at this time penetrated $\frac{1}{16}$ of an inch beyond the interface between the cooked layer and the uncooked starchy interior of the potato.

The method of this invention is subject to a certain amount of alteration, without sacrificing the principal benefits thereof. For instance, instead of performing the steps above described as the preferred embodiment of the method, and which may be hereafter referred to as modification A, the method is susceptible of embodiment in modification B, the procedure of which is as follows:

The potatoes are first peeled and trimmed. They are then thoroughly cooled to approximately 40° F., as by passing these through a tank of cold water. The potatoes are then heat treated to provide the cooked envelop aforementioned, following which they are introduced into the preservative solution at room temperature, for instance, 60° F. to 70° F. The previous cooling of the potatoes is such that the latter have sufficient heat absorptive capacity to cool the heat treated outer layers of the potatoes to room temperature by the time the potatoes are introduced into the preservative solution. This prevents warming up the $SO_2$ solution which would cause excessive evaporation of the $SO_2$ therefrom. It also cuts down on the evaporation of the $SO_2$ from the preservative solution on the potatoes after the latter have been treated with this solution.

Modification B concludes with subjecting the potatoes to the edible acid spray after which they are bagged and placed in refrigeration.

Modification C differs from modification B in that the potatoes are not cooled before they are heat treated, but the preservative solution is acidified and cooled to maintain this at a temperature of from 42° F. to 50° F. Excessive evaporation of $SO_2$ from an acidified preservative solution is thus prevented and the latter is used as a medium for cooling the potatoes after their heat treatment which, of course, keeps the evaporation of $SO_2$ from the potatoes themselves at a minimum.

Modification D contemplates employing a steam peeling operation for accomplishing not only the peeling of the potatoes but the production of the cooked envelop of uniform thickness enclosing the entire potato after this has been trimmed. This is effected by doing the trimming of the potato before this enters the steam peeler. A fairly thorough job of trimming must be done in this case, in which all the eyes and any rotted or imperfect portions of the potatoes are trimmed therefrom.

The potatoes are now steam peeled and are allowed to remain in the steam peeler for such a period and under such a temperature as will produce the desired cooked envelop and at the same time loosen the skin remaining on the potatoes. In the next step, the potatoes are cooled to about 70° F., preferably by a water spray which at the same time washes off the loosened skins.

By virtue of the fact that the trimming has already been accomplished and the only portions of the skin remaining on the potatoes are relatively exposed to the action of the water spray, the latter can be depended upon to remove these skins without the necessity of an abrasive action. The cooked envelop produced by the peeling operation will thus remain practically intact and may be depended upon to perform the function of this envelop in combining with the preservative agent to protect the potato against darkening. In this modification, the separate heat treating step is eliminated and the potatoes, after being cooled and having the skins washed therefrom by water spray, are subjected to the steps of applying the preservative, the edible acid spray, the bagging, and, finally, the refrigeration of the bagged potatoes.

Modification E is designed for the purpose of supplementing fungicidal action of the heat treating step by cooling the potatoes in a fungicidal solution between the heat treating step and the step of applying the preservative agent. The fungicidal agent preferably used for this purpose is an aqueous solution of a hypochlorite of an alkali forming metal, such as sodium hypochlorite, within a range of 25 to 500 parts per million of available chlorine. This solution is preferably maintained at a temperature between 32° F. and 40° F. by constantly adding cracked ice thereto and a concentrated solution of the fungicidal agent may be fed automatically to the cooling solution to maintain this at the desired strength. Following the cooling and sterilizing of the potatoes in this hypochlorite solution, they are subjected to an antichlor solution at room temperature which may be a solution of any of the sulfur compounds suitable for use as one of the preservative agents employed in modification A. This step may be followed by the edible acid spray step and the potatoes thereafter bagged and refrigerated.

Modification F of the process of this invention differs from modification A in that following the peeling, trimming and heat treating steps, the potatoes are vacuum cooled and the vacuum subsequently broken by the introduction of $SO_2$ gas into the vacuum chamber occupied by the potatoes. In this step the potatoes are held in the $SO_2$ gas until a sufficient quantity of this has been absorbed by the moisture of the potatoes to produce in the cooked envelop of the potato a quantity of sulfurous acid equivalent to that applied in modification A. Following this, the potatoes are released from the vacuum chamber, bagged and then refrigerated.

We claim:

1. A method of producing fresh, whole, peeled potatoes to cause these to be highly resistant to spoilage from decay and enzymatic oxidation during storage for a substantial period between their production and ultimate consumption, which comprises: peeling said potatoes; trimming the eyes and spoiled portions from said potatoes; heat treating said potatoes to cook the surface starchy cells of each of said potatoes to a uniform depth of from $\frac{1}{16}$ of an inch to $\frac{1}{8}$ of an inch to form a relatively thin, continuous envelop of cooked cells which enclose the raw cells making up the rest of the potato; and applying an enzymatic oxidation inhibitor containing approximately 1% available $SO_2$ to said potatoes for less than one minute.

2. A method of producing fresh, whole, peeled potatoes to cause these to be highly resistant to spoilage from decay and enzymatic oxidation during storage for a substantial period between their production and ultimate consumption, which comprises: peeling said potatoes; trimming the eyes and spoiled portions from said potatoes; heat treating said potatoes to cook the surface starchy cells of each of said potatoes to a uniform depth of approximately 1/8 of an inch to form a relatively thin, continuous envelop of cooked cells which enclose the raw cells making up the rest of the potato; and applying an aqueous solution of an enzymatic oxidation inhibitor containing approximately 1.0% available $SO_2$ to said potatoes for less than one minute.

3. A method of producing fresh, whole, peeled potatoes to cause these to be highly resistant to spoilage from decay and enzymatic oxidation during storage for a substantial period between their production and ultimate consumption, which comprises: peeling said potatoes; trimming the eyes and spoiled portions from said potatoes; heat treating said potatoes to cook the surface starchy cells of each of said potatoes to a uniform depth of from 1/16 of an inch to 1/8 of an inch to form a relatively thin, continuous envelop of cooked cells which enclose the raw cells making up the rest of the potato; applying an aqueous solution of an enzymatic oxidation inhibitor containing approximately 1% available $SO_2$ to said potatoes for less than one minute; and applying to said potatoes in diffused form a dilute solution of an edible acid.

ARTHUR F. KALMAR.
ROBERT W. KILBURN.
HARRY M. PANCOAST, Jr.

REFERENCES CITED

The following references are of record in the file of this patent:

UNITED STATES PATENTS

| Number | Name | Date |
|---|---|---|
| 1,948,877 | Draper | Feb. 27, 1934 |
| 1,948,884 | Patterson | Feb. 27, 1934 |
| 2,006,146 | Miller | June 25, 1935 |
| 2,241,436 | Williams | May 13, 1941 |
| 2,383,907 | Beechem et al. | Aug. 28, 1945 |